Nov. 1, 1938.          L. D. H. ANDERSON          2,134,848
                          TRACTOR PLOW
                       Filed Nov. 16, 1937
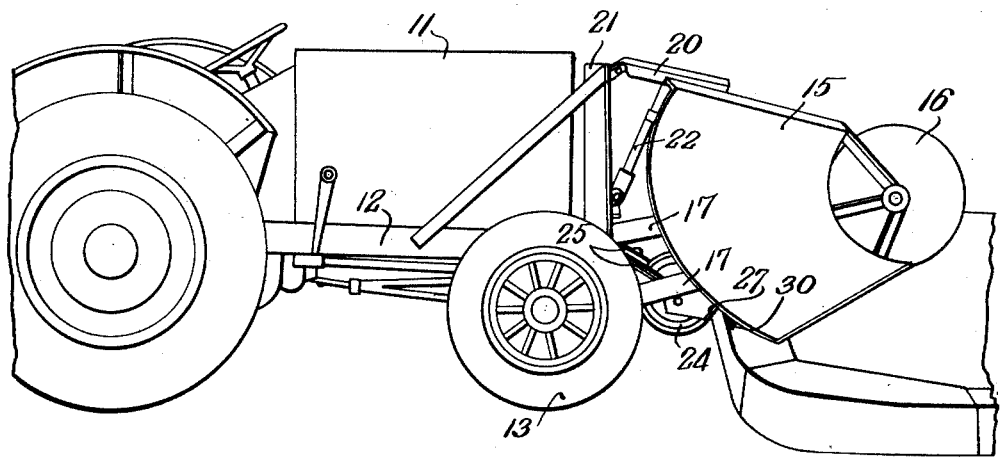
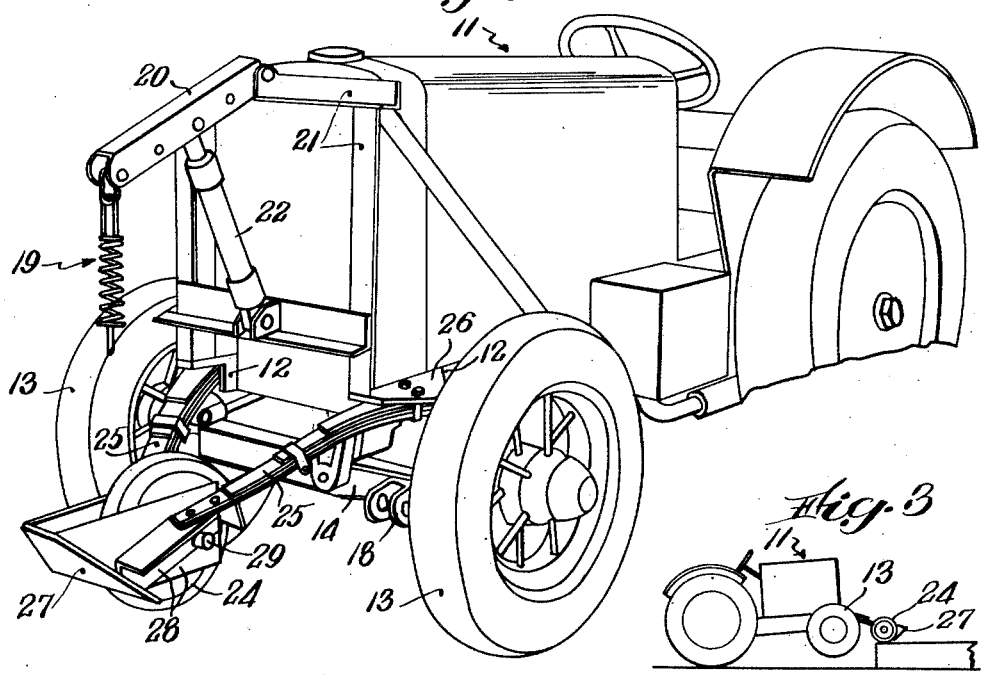
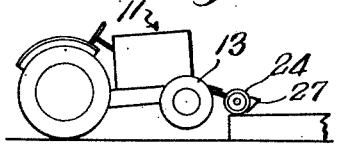
Inventor
LLOYD D. H. ANDERSON
by Thomson & Thomson
his Attys Patented Nov. 1, 1938

2,134,848

UNITED STATES PATENT OFFICE 2,134,848

TRACTOR PLOW

Lloyd D. H. Anderson, Wellesley, Mass.

Application November 16, 1937, Serial No. 174,821

4 Claims. (Cl. 37—42)

This invention relates to improvements in motorized snowplows or scrapers for roads, drives or sidewalks, and the principal purpose of the invention is to provide simple, compact and efficient road-scraping apparatus which may be combined with or mounted upon an ordinary tractor or other motor vehicle in such a way that damaging impact between the front wheels of the vehicle and road obstructions or curbings is avoided by the provision of lifting mechanism which serves to absorb the shock of impact as well as to raise the wheels onto the obstruction.

Another object is to provide resilient or yielding means for connecting the lifting mechanism to the vehicle, at the frame, axle, drawbar or other suitable part thereof; in order to cushion the lifting force of said vehicle.

Further objects reside in the novel features of the apparatus hereinafter described in connection with the accompanying drawing of a recommended embodiment of the invention; said features being pointed out in the appended claims.

In the drawing,

Fig. 1 is a side view of a tractor equipped with the improved plow and wheel-lifting mechanism, the latter being in engagement with a curbstone which the tractor is about to surmount;

Fig. 2 is a front perspective of the tractor with the scraping apparatus removed to show the lifting mechanism; and Fig. 3 is a diagrammatic view showing the position of the front wheels of the tractor as they are lifted in mounting a curbing.

In the particular embodiment chosen for the purpose of illustration, the snow plowing apparatus is mounted upon a motorized tractor indicated generally at 11 and having side frames 12 and front wheels 13 attached to a front axle 14. The specific construction of the tractor is not otherwise pertinent to this invention, and it will be understood that the improved apparatus may form part of or be applied to any suitable motor vehicle, including tractors which are not provided with side frames.

The plow or scraper mechanism proper may be of any usual type or construction heretofore employed for this purpose. As shown, it comprises a curved scraper 15 equipped with a guide wheel 16, and supported in front of the vehicle by push arms 17 secured to the axle 14 at the hinge knuckles 18, and suspended by a spring and chain link 19 from arm 20 pivoted to the top bar of the frame 21 suitably erected and braced upon the vehicle at the front thereof. A pneumatic or hydraulic jack 22 may be provided to lift the arm 20 and raise the scraper 15 and its wheel 16.

In accordance with the present invention, the vehicle is provided with lifting mechanism adapted to engage a curbstone or other obstruction in the path of its relatively small front wheels and to raise said wheels (and the front of the tractor) upon or over the obstruction, thereby to allow the vehicle to be easily driven over the curb to avoid damage to the tires, axles, steering devices or other parts which would be injured or strained by abrupt impact between the wheels and the curbing or by forcibly driving the vehicle into the obstruction; and also to avoid stalling of the tractor or wear upon the tires of its driving wheels, which would spin for lack of traction if the forward movement of the tractor were entirely impeded by the obstruction or curbing. The lifting mechanism comprises a rubber-tired wheel or roller 24, preferably mounted between a pair of arms 25 which are secured to the frame 12 or other part of the vehicle by bolting them to a bracket 26, or by other suitable means, and which project forwardly of the vehicle so that the wheel 24 is supported slightly above the normal road surface. As shown, the arms consist of leaf springs which augment the cushioning and shock-absorbing action of the lifting mechanism; but it will be understood that said arms may be rigid, in many installations, for the shock of impact is absorbed or cushioned (though to a lesser degree) by the rubber tire on the wheel 24 and by the skid about to be described.

An inclined skid 27 is preferably mounted in front of the wheel 24 to guide the wheel onto the obstruction, the bottom of the skid being located substantially below the center of the wheel; and in the arrangement illustrated, the brackets or plates 28 which connect the skid to the springs 25 also serve as trunnions for the axle 29 of the wheel 24. The lifting wheel and skid are thus so constructed and attached to the vehicle that the shock of impact is cushioned and absorbed by the skid, tire and springs; yet the spring arms are sufficiently strong to elevate and support the front wheels 13 and front end of the vehicle when the lifting wheel 24 rides over a curbing, as indicated in Fig. 3, so that the wheels 13 meet the edge of the curb at or near the bottom of their treads without objectionable jar or bump.

When the wheel supporting arms 25 are leaf springs, as shown, or comprise other resilient or yielding means, as is preferred in most instances, the shock of impact between the lifting wheel 24 and the curbstone (relieved to some extent by the skid and rubber tire) is further lessened; thereby reducing the likelihood of damage to the skid or the wheel, and making it easier for the skid to ride over the obstruction.

It will be understood that the guide wheel 16 of the scraper 15 serves to lift the scraper over curbings or other obstructions, the hinged push arms 17 tilting upwardly as the scraper is elevated and thus moved out of the way of the inclined skid and tractor-lifting wheel 24. Hence, although the scraper and the lifting mechanism for the vehicle operate independently in this respect, they cooperate in providing an efficient motorized snowplow which may be run over sidewalk curbings or other obstructions without damage to the machine and without delay or unnecessary effort on the part of the operator.

It will also be understood that the structural details of the apparatus herein described may be varied to suit particular purposes or conditions without departing from the spirit of this invention as set forth in the following claims; and that the motorized plow is adapted for use in road scraping generally, and not exclusively for snow removal.

I claim:

1. Lifting mechanism for plows having a scraper mounted in front of a vehicle, comprising a rubber-tired roller disposed between the scraper and the front of the vehicle, an inclined skid mounted in front of and adjacent to the roller, and an arm connecting the roller and skid to the vehicle and supporting the roller adjacent the normal road surface when the front wheels of the vehicle are on the road, so that the skid and the roller engage and ride over obstructions on the road surface, thereby lifting the front end of the vehicle and enabling the front wheels thereof to roll over the obstruction without impeding the forward progress of the vehicle and without injurious shock to the roller or the vehicle.

2. Lifting mechanism for motorized plows having a scraper mounted in front of a vehicle, comprising a roller disposed between the scraper and the front of the vehicle, and a resilient arm connecting the roller to the vehicle and supporting the roller adjacent the normal road surface when the front wheels of the vehicle are on the road, said roller and arm being constructed and arranged to lift and support the front wheels of the vehicle above the road surface when the roller rides over an obstruction, whereby the front wheels are rolled over the obstruction without impeding the forward progress of the vehicle.

3. Lifting mechanism for motorized plows having a scraper mounted in front of a vehicle, comprising a roller disposed between the scraper and the front of the vehicle, an inclined skid mounted in front of and adjacent to the roller with its lower edge spaced below the center of the roller, and spring means connecting the roller and skid to the vehicle and adapted to support the front wheels of the vehicle above the road surface when the roller rides over an obstruction, said spring being yieldable thereby to cushion the shock of impact when the skid or roller strikes an obstruction, so that the front wheels of the vehicle are rolled over the obstruction substantially without jar and without impeding forward progress of the vehicle.

4. A motorized plow comprising a vehicle, a scraper mounted a substantial distance in front of the vehicle, a roller located between the scraper and the front of the vehicle, an inclined skid mounted in front of and adjacent to the roller with its bottom edge disposed below the axis of the roller, and spring means secured to the vehicle and connected to the roller and skid, said spring being yieldable to cushion the shock of impact when the skid or roller strikes an obstruction, and sufficiently strong to support the front wheels of the vehicle above the road surface when the roller rides over the obstruction, so that said wheels are lifted onto the obstruction substantially without jar to the vehicle and without impeding its forward progress.

LLOYD D. H. ANDERSON.